US005134491A

United States Patent [19]

[11] Patent Number: 5,134,491

[45] Date of Patent: Jul. 28, 1992

Muraji et al.

[54] PROJECTION TYPE IMAGE DISPLAY APPARATUS

[75] Inventors: Tsutomu Muraji, Nara; Yoshito Miyatake, Neyagawa, both of Japan

[73] Assignee: Matsushita Electric Industrial Co., Ltd., Osaka, Japan

[21] Appl. No.: 496,199

[22] Filed: Mar. 19, 1990

[30] Foreign Application Priority Data

Jan. 18, 1990 [JP] Japan .................................. 2-008641

[51] Int. Cl.[5] ............................................... H04N 5/74

[52] U.S. Cl. .................................... 358/231; 358/165; 315/290; 315/360

[58] Field of Search .................. 353/85; 358/165, 231, 358/232, 60, 61; 315/289, 290, 360

[56] References Cited

U.S. PATENT DOCUMENTS 3,470,310 9/1969 Shashoua .............................. 358/61
3,549,795 12/1970 Mullin .................................. 358/165
4,206,385 6/1980 Wisbey ................................ 315/360
4,275,337 6/1981 Knoble et al. ...................... 315/289
4,279,035 7/1981 Skerlos ............................... 358/165
4,339,695 7/1982 Siglock ............................... 315/289
4,378,514 3/1983 Collins ............................... 315/290
4,484,109 11/1984 Buser .................................. 315/290
4,641,190 2/1987 Testin et al. ........................ 358/165
4,763,044 8/1988 Nuckolls et al. .................... 315/289
4,903,334 2/1990 Anderson ........................... 358/165
4,924,109 5/1990 Weber ................................ 315/360
4,962,336 10/1990 Dodd et al. ......................... 315/290

FOREIGN PATENT DOCUMENTS 0070881 4/1985 Japan .................................. 358/165
0235592 11/1985 Japan .................................. 358/165
0236876 9/1989 Japan .
0069084 3/1990 Japan .

OTHER PUBLICATIONS

"LCD Full-Color Video Projector", Morozumi et al.; SID 86 DIGEST, pp. 375–378.

*Primary Examiner*—Howard W. Britton
*Assistant Examiner*—Jeffrey S. Murrell
*Attorney, Agent, or Firm*—Wenderoth, Lind & Ponack

[57] ABSTRACT

A projection type image display apparatus uses an optical modulation image display device as a light valve. Notwithstanding the use of a metal vapor discharge lamp which has a long re-starting period of time as a light source, the apparatus can display images instantaneously by igniting the discharge lamp for a prescribed period of time after switching off and then on again a main power source of the apparatus. Also, the projection type image display apparatus does not generate audio noise at the time of starting the discharge lamp. Furthermore, even in case of adding an instantaneous re-ignition circuit, the frequency of use of such instantaneous re-ignition circuit can be suppressed to an utmost extent, and the useless igniting period of time of the discharge lamp can be curtailed.

20 Claims, 5 Drawing Sheets

PROJECTION TYPE IMAGE DISPLAY APPARATUS

BACKGROUND OF THE INVENTION

1. Field of the Invention

The present invention relates to a projection type image display apparatus using an optical modulation image display device as represented by a liquid crystal display device as a light valve.

2. Description of Prior Art

Heretofore, there has been well known, in order to realize a large size image display, a method of forming an optical image according to a video signal on a relatively small light valve as a variation of the optical characteristic, irradiating this optical image by illuminating light, and projecting it on a screen by a projection lens. In the projection type image display apparatus of this kind, the resolution of the projected image is mainly determined by the resolution of the light valve, and since the optical output is enlarged by intensification of the light source, a projection type image display apparatus having high resolution and large optical output can be realized by the use of a light valve having a high resolution, even if its display area is small. Recently, a method of using a liquid crystal display device as a light valve has been noted with attention. For example, Morozumi et al. proposes in "LCD Full-Color Video Projector", SID 86 Digest, p. 375, a method of obtaining a full color projection image by using three liquid crystal display devices.

Construction of the conventional projection type image display apparatus using a liquid crystal display device as a light valve as such is explained.

Light irradiated from a lamp is converted into nearly parallel rays by a condenser optical display unit, and is then passed through a the liquid crystal display device, and enters a projection lens. In the liquid crystal display device, an optical image according to the video signal is formed, and this optical image is projected on the screen by the projection lens. The audio signal is processed by an audio signal processing circuit to drive the speaker. As a lamp, a halogen lamp, a xenon lamp, a metal halide lamp, etc. may be used. Starting and stopping of the ballast and igniter circuit for lighting the lamp are performed simultaneously with switching ON or OFF of the main power switch.

However, in case of using a metal halide lamp in such a conventional projection type image display apparatus, in order to re-ignite the metal halide lamp, a waiting time is required until the internal pressure of the lamp is lowered, i.e., until the temperature of the lamp is lowered. As such, due to the long duration before re-igniting, the metal halide lamp has the following problems. For instance, when a viewer turns a main power switch off by erroneous operation while using a remote controller, the lamp is instantly put off, but even if the viewer, becoming aware of his erroneous operation, puts the main power switch on, normally the lamp is not instantly lighted. This state is extremely inconvenient to the viewer.

If a high voltage pulse of about 30 KV is used only for re-starting, the metal halide lamp can be instantaneously ignited, but it involves such a problem that the electrode constituting the lamp is significantly deteriorated at the time of application of a high voltage pulse.

Furthermore, in starting the lamp, the metal halide lamp is under application of a high voltage pulse of several KV from the ballast and igniter circuit for several seconds, so that, in starting the lamp, i.e., during the time of application of a high voltage pulse to the lamp, noise comes into the audio signal due to the interference from the ballast and igniter circuit to generate an unpleasant sound.

SUMMARY OF THE INVENTION

An object of the present invention is to provide a projection type image display apparatus which, not withstanding the use of a metal vapor discharge lamp having a long re-ignition time, even when the main power switch is turned on immediately after turning off the main power switch, can instantaneously display an image, and is free from generation of audio noise in starting the lamp.

In order to attain the above object, a projection type image display apparatus of the present invention comprises:

a metal vapor discharge lamp;

a ballast and igniter circuit for igniting said metal vapor discharge lamp;

an image display device for modulating light radiated from the metal vapor discharge lamp according to a video signal to obtain a modulated light;

an image display circuit for operating said image display device according to the video signal;

an optical system for guiding the light radiated from the metal vapor discharge lamp to the image display device and projecting the modulated light from the image display device onto a screen; and a delay means for inactivating the ballast and igniter circuit to turn off the metal vapor discharge lamp after a prescribed delay time following a turning off of a main power source of the apparatus.

Furthermore, when in audio signal processing circuit for processing an audio signal is additionally provided on the projection type image display apparatus, the apparatus may have an audio signal control circuit for muting the audio signal for a certain period of time from after the ballast and igniter circuit has been activated.

More preferably, the projection type image display apparatus may further comprise:

an instantaneous re-ignition circuit for instantaneously igniting the metal vapor discharge lamp; and a control circuit for starting the instantaneous re-ignition circuit when the main power source is turned on after a prescribed interval of time following the inactivation of the ballast and igniter circuit.

By the construction as described above, even in case of using a metal vapor discharge lamp having a long re-starting time as a light source of the projection type image display apparatus, in switching on the main power switch immediately after the main power source is turned off due to such cause as an erroneous operation in using a remote-controller, images can be instantly displayed without using a high voltage pulse generating circuit, i.e., instantaneous re-ignition circuit, which is liable to cause deterioration of the electrode of the lamp, and no audio noise is generated.

Furthermore, even when an instantaneous re-ignition circuit for re-igniting instantly a metal vapor discharge lamp is additionally provided, it is possible to suppress the frequency of use of the instantaneous re-ignition circuit to the greatest possible extent, and also to suppress the useless lighting duration of the discharge lamp, i.e., the required delay time until the stoppage of the ballast and igniter circuit after turning off the main power switch. Accordingly, the present invention apparatus has extremely great effect.

The characteristics and effects of the present invention will be more apparent when taken in reference to the later-described embodiment and the appended drawings.

DESCRIPTION OF PREFERRED EMBODIMENT

Figure 1:
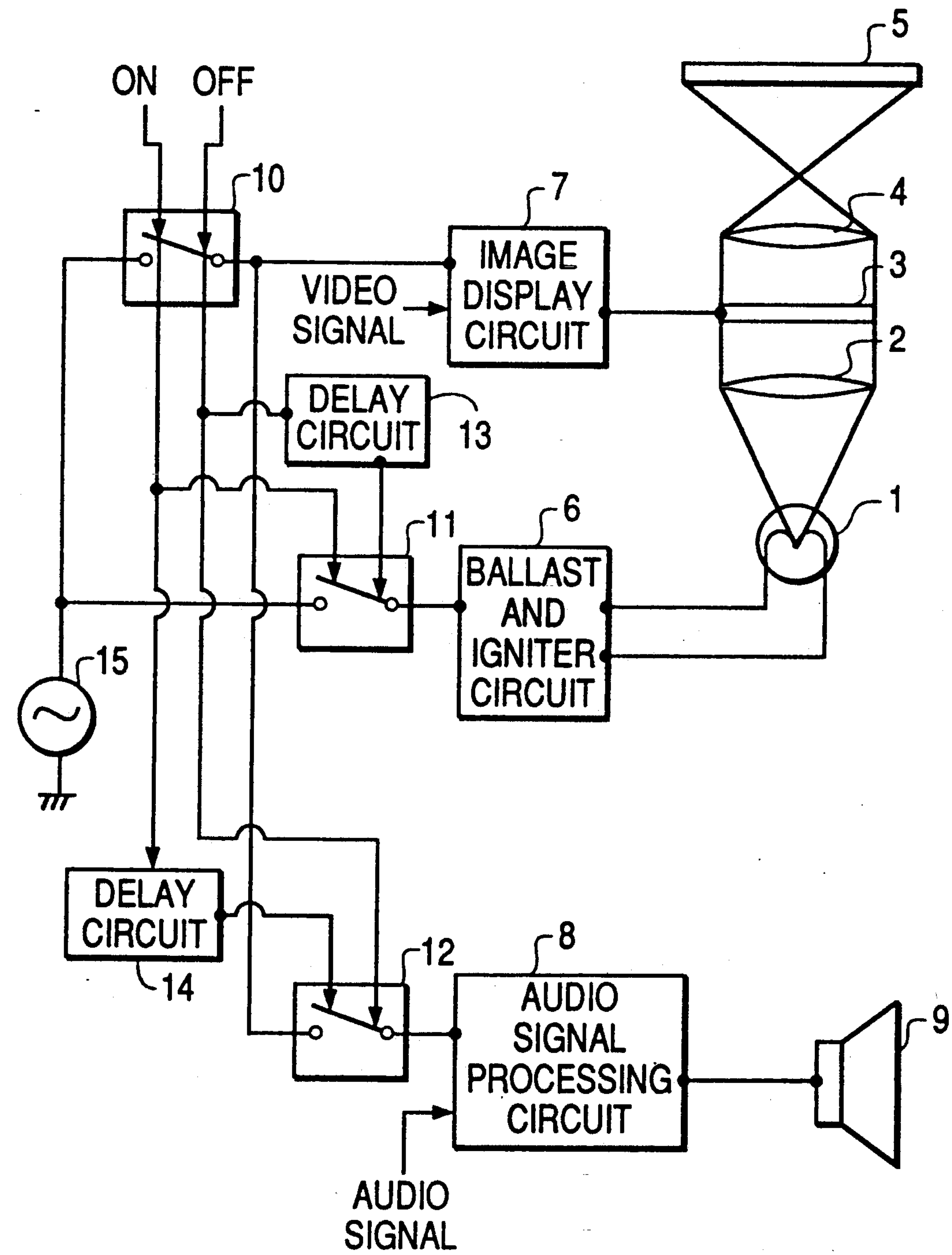
FIG. 1 is a block diagram of a part of a projection type image displaym apparatus in accordance with first embodiment of the present invention.

FIG. 1 is a block diagram showing a construction of a part of the first embodiment of the present invention.

In FIG. 1, the light radiated from a discharge lamp 1 is converted into nearly parallel rays by means of a condenser optical element (lens) 2, and then passed through an image display device 3 and is projected by a projection lens 4 onto a screen 5. The image display device 3 is a liquid crystal display device, and due to a change of the permeability thereof, an optical image according to a video signal is formed. This optical image is projected on the screen 5 by the projection lens 4. As the discharge lamp 1, a metal vapor lamp such as a metal halide lamp, a mercury lamp, a sodium lamp, etc. may be used. Especially, a metal halide lamp has good lamp efficiency and lamp life, and also luminous spectrum characteristic suitable for the image display apparatus.

Figure 2:
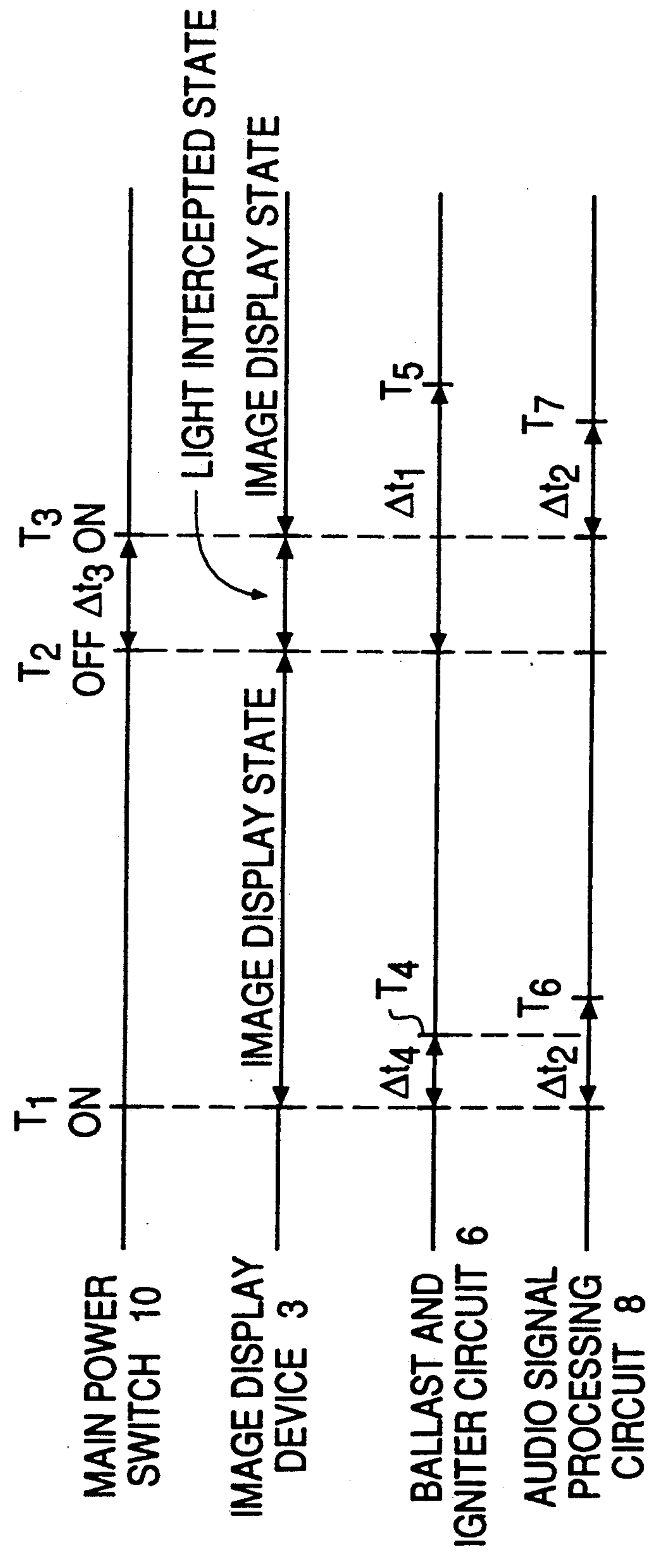
FIG. 2 is a timing chart showing the operation of the respective elements of the first emboidment.

In FIG. 2, $T_1$ is a time at which a main power switch 10 is on, $T_2$ a time at which the main power switch 10 is off, and $T_3$ a time at which the main power switch 10 is on again. $T_4$ is a time at which the discharge of the discharge lamp 1 is started, being determined by a period of time $\Delta t_4$ during which a high voltage pulse of about 4 KV is generated by a ballast and igniter circuit 6 from the time $T_1$ at which the main power switch 10 is on. $T_5$ is a time at which the discharge lamp 1 is put off, being determined by a delay period of time $\Delta t_1$ of a first delay circuit 13 from the time $T_2$ at which the main power switch 10 is turned off. $T_6$ is a time at which sound is reproduced from a speaker 9, being determined by a delay period of time $\Delta t_2$ of a second delay circuit 14 from the time $T_1$ at which the main power switch 10 is turned on.

First, at the time $T_1$ at which the main power switch 10 is on, power is suplied from a power source 15 to an image display circuit 7 and the ballast and igniter circuit 6. The image display circuit 7 driver the image display device 3 to form an image according to the inputted image signal. In the ballast and igniter circuit 6, in order to initially start the discharge lamp 1, a high voltage pulse of abut 4 KV is generated for a period of time of $\Delta t_4$ and applied to the discharge lamp 1. In the discharge lamp 1, discharge is started to the time $T_4$, and thereafter a voltage of 100 V is applied to the discharge lamp 1.

Also, at the time $T_1$, the main power switch ON signal is inputted to the second delay circuit 14, delayed by $\Delta t_2$ period, and turns on the power switch 12 for an audio signal processing circuit 8 at the time $T_6$. The inputted audio signal is amplified in the audio signal processing circuit 8 after the time $T_6$ to drive the speaker 9. At this time, by operating the audio signal processing circuit 8 at a time to make the delay period of time $\Delta t_2$ longer than the high voltage pulse generating period $\Delta t_4$, i.e., after the time $T_4$, no unpleasant sound by the intake of noise in the audio signal by the interference of the high voltage pulse of the ballast and igniter circuit 6 is generated. Normally, since the high voltage pulse generating period $\Delta t_4$ is about 2 to 3 seconds, when $\Delta t_2$ is set to about 4 to 5 seconds, no disagreeable feeling is given to the viewer.

Next, at the OFF time $T_2$ of the main power switch 10, simultaneously with the off signal of the main power switch 10, the power supply to the image display circuit 7 and the audio signal processing circuit 8 from the power source 15 is turned off. When a liquid crystal display device is used for the image display device 3 in normally black state, the image display device 3 becomes a light intercepted state, and nothing is displayed on the screen, so that the viewer notices the fact of having turned off the main power switch 10.

Also, at the time $T_2$, the OFF signal of the main power switch 10 is inputted to the first delay circuit 13 to cause a delay by the time period of $\Delta t_1$, turns off a power switch 11 for the ballast and igniter circuit 6 at a time $t_5$ to turn off the discharge lamp 1. Here, there is assumed a case where the main power switch 10 is turned off by an erroneous operation which frequently occurs in the case of for example the use of a remote controller by a viewer. If the main power switch 10 is erroneously turned off at the time $T_2$, the image display device 3 becomes a light intercepted state to display nothing on the screen 5, so that the viewer notices the fact of having turned off the main power switch 10. When the main power switch 10 is turned on again at the time $T_3$ after $\Delta t_3$, power is supplied to the image display circuit 7 from the power source 15, by which the image display circuit 7 drives the image display device 3 to form an image according to the inputted image signal. As the discharge lamp 1 is ignited at that time, the optical image formed on the image display device 3 is projected on the screen 5 by the projection lens 4 to give images instantaneously. Normally, the period of time $\Delta t_3$ for an operator, becoming aware of the erroneous operation, to turn on the main power switch 10 again is about 2 to 10 seconds. Accordingly, a great effect is obtainable by setting $\Delta t_1$ to be about 10 to 30 seconds.

As above, as the discharge lamp 1 is ignited for a prescribed period of time after the main power switch 10 is turned off by an erroneous operation, if the main power switch is turned on upon notice of the erroneous operation, the image can be promptly displayed, thereby giving no feeling of inconvenience to the viewer.

In the abovementioned explanation, a liquid crystal display device is used as the image display device 3, but any device whatsoever, such as an electro-optical crystal device, may be used if it can display images due to a variation of its optical characteristics and by an electrical signal.

Figure 3:
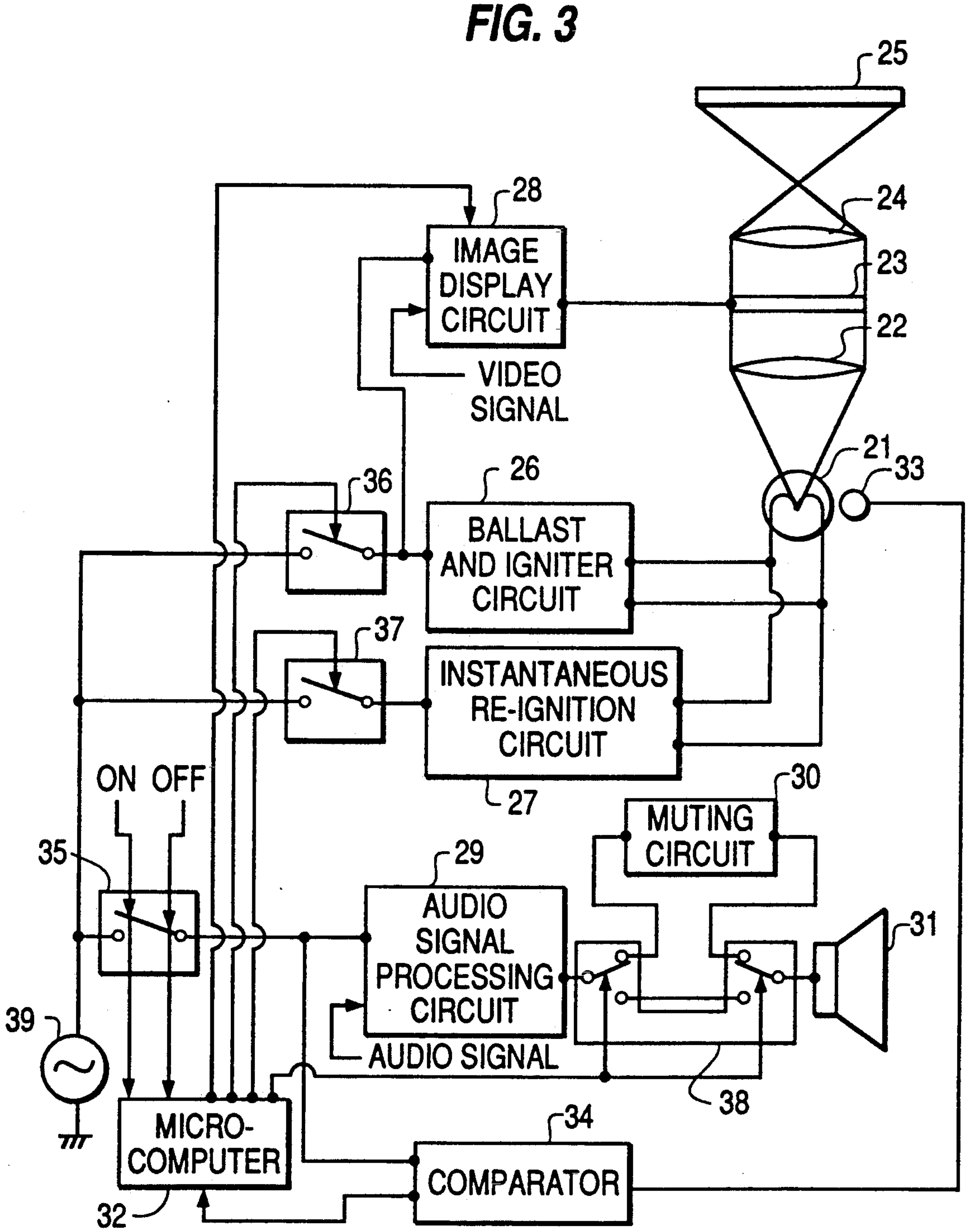
FIG. 3 is a block diagram of a part of a projection type image display apparatus in accordance with a second embodiment of the present invention.

FIG. 3 is a block diagram showing a construction of a part of the second embodiment of the present invention.

In FIG. 3, the light radiated from a discharge lamp 21 is converted into nearly parallel rays by means of a condenser optical element (lens) 22, passed through an image display device 23 and is incident on a projection lens 24. The image display device 23 is a liquid crystal display device, and due to a change of the permeability, an optical image according to a video signal is formed. This optical image is projected on a screen 25 by the projection lens 24.

Figure 4:
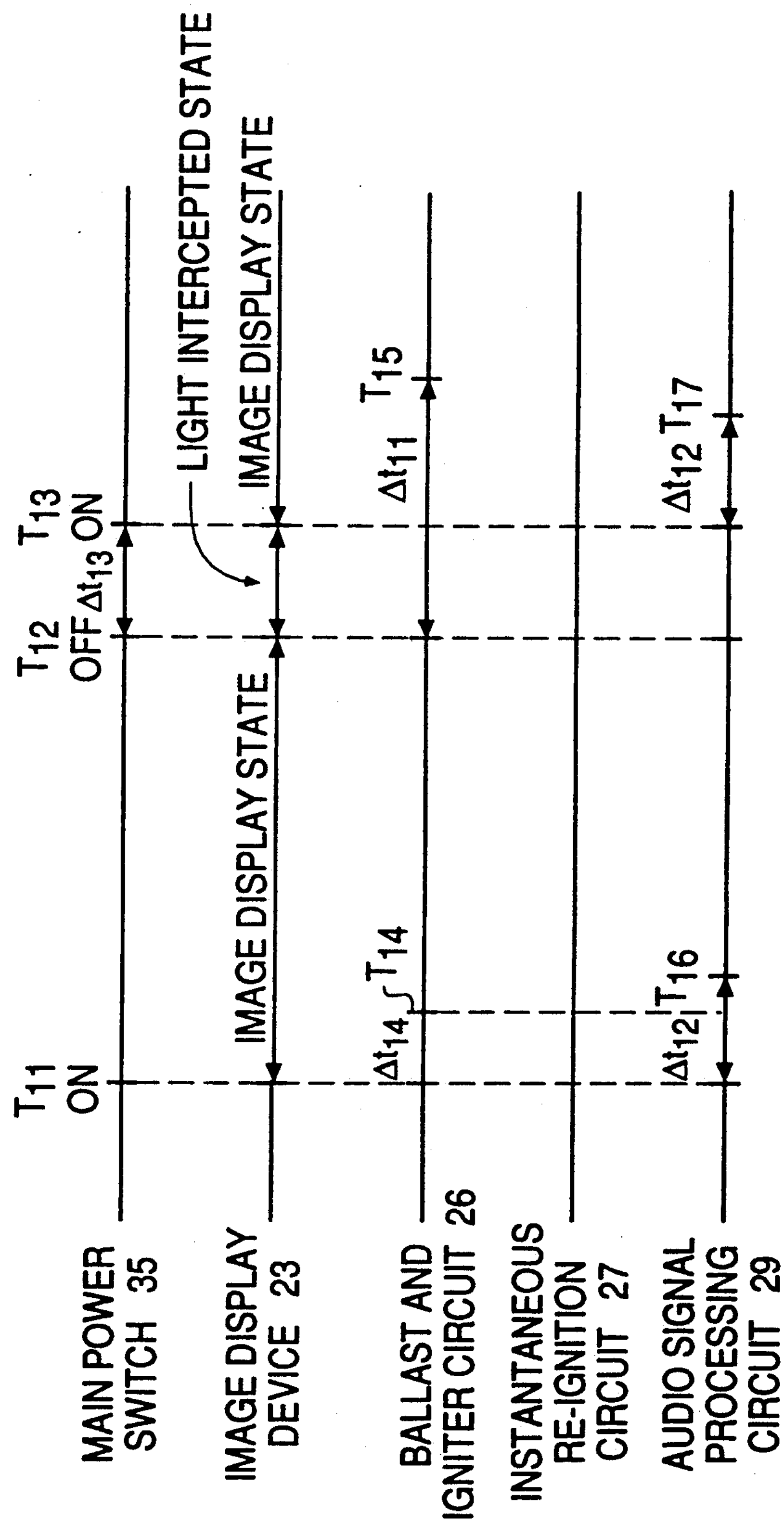
FIG. 4 is a timing chart showing the operation of case 1 of the respective elements of the second embodiment.

First, for case 1, there is assumed a case where a main power swich 35 is turned off by an erroneous operation which frequently occurs in the case of the use of a remote controller by a viewer, after which it is promptly turned on. In FIG. 4, $T_{11}$ is a time at which the main power switch 35 is on, $T_{12}$ a time at which the main power switch 35 is off, and $T_{13}$ a time at which the main power switch 35 is on again. $T_{14}$ is a time at which the discharge of the discharge lamp 21 is started, being determined by a period of time $\Delta t_{14}$ during which a high voltage pulse of about 4 KV is generated by a ballast and igniter circuit 26 from the time $T_{11}$ at which the main power switch 35 is on. $T_{15}$ is a time at which the discharge lamp 21 is put off, and $T_{16}$ is a time at which sound is reproduced from a speaker 31. The period of time $\Delta t_{11}$ between the off time $T_{12}$ of the main power switch 35 and the off period of time $t_{15}$ of the discharge lamp 21, and the period of time $\Delta t_{12}$ between the time $T_{13}$ at which the main power switch 35 is on and the time $T_{17}$ at which the sound is reproduced from the speaker 31 is determined by a microcomputer 32.

At the time $T_{11}$ at which the main power switch 35 is on, simultaneously with the input of the ON signal of the main power switch 35 to the microcomputer 32, the ballast and igniter circuit power switch 36 is turned on by a control signal from the microcomputer 32. At this time, power is supplied to an image display circuit 28 and the ballast and igniter circuit 26 from a power source 39. The image display circuit 28 drives the image display device 23 to form an image according to the inputted image signal. In the ballast and igniter circuit 26, in order to initially start the discharge lamp 21, a high voltage pulse of about 4 KV is generated for a time period of $\Delta t_{14}$ and applied to the discharge lamp 21. In the discarge lamp 21, discharge is started at the time $T_{14}$, and thereafter a voltage of 100 V is applied to the discharge lamp 21. The inputted audio signal is amplified by an audio signal processing circuit 29. At the time $T_{11}$, a selection switch 38 is switched to a side for connection to a mute circuit 30 by the microcomputer 32. At the time $T_{16}$ after $\Delta t_{12}$ of the time $T_{11}$, the selection switch 38 is connected to a side for bypassing the mute circuit 30, and the amplified audio signal drives the speaker 31. At this time, by elongating the period of time $\Delta t_{12}$ so as to be longer than the high voltage pulse generating period $\Delta t_{14}$, i.e., by bypassing the mute circuit 30 after the time $T_{14}$, no unpleasant sound by the remaining of noise in the audio signal by the interference of the high voltage pulse of the ballast and igniter circuit is generated. Normally, since the high voltage pulse generating period $\Delta t_{14}$ is about 2 to 3 seconds, when the mute period $\Delta t_{12}$ is set to about 4 to 5 seconds, no disagreeable feeling is given to the viewer.

At the OFF time $T_{12}$ of the main power switch 35, simultaneously with the off signal of the main power switch, the power supply to the audio signal processing circuit 29 from the power source 39 is turned off. When a liquid crystal display device is used for the image diaplay device 23 in a normally white state, the image display circuit 28 causes the display device 23 to be in a light intercepted state by a control signal of the microcomputer 32 to display a black color on the screen. Accordingly, the viewer notices the fact of having turned off the main power switch 35.

When the viewer, becoming aware of the erroneous operation, turns on the main power switch 35 again at the time $T_{13}$ after $\Delta t_{13}$, the image display circuit 28 drives the image display device 23 to form an optical image according to the image signal under the control signal of the microcomputer 32. Since the discharge lamp 21 is ignited at that time, the optical image formed on the image display device 23 is projected on the screen 25 by the projection lens 24 to give images instantaneously. Normally, the period of time $\Delta t_{13}$ for an operator, becoming aware of the erroneous operation, to turn on the main power switch 35 again is about 2 to 10 seconds. Accordingly, a great effect is obtainable by setting $\Delta t_{11}$ to be about 10 to 30 seconds.

Figure 5:
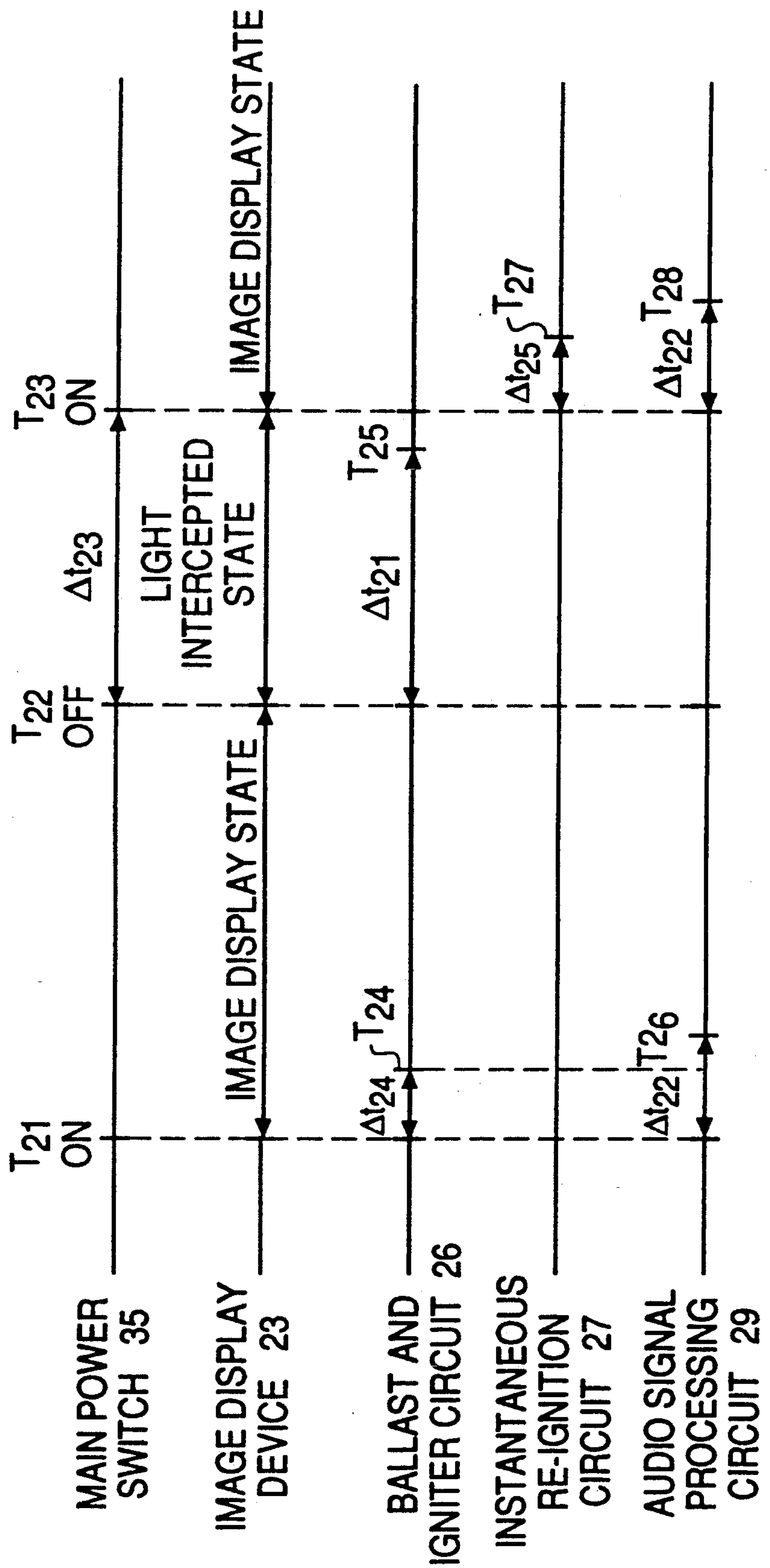
FIG. 5 is a timing chart showing the operation of case 2 of the respective elements of the second embodiment.

Next, for case 2, an explanation is provided below for the case where the viewer who turned off the main power switch has turned it on again after some time, e.g., about 60 seconds. In FIG. 5, $T_{21}$ is the ON time of the main power switch 35, $T_{22}$ is the OFF time of the main power switch 35, $T_{23}$ is the time at which the main power switch 35 is again turned on, $T_{24}$ is a discharge starting time of the discharge lamp 21, $T_{25}$ is a time at which the discharge lamp 21 is turned off, and $T_{26}$ and $T_{28}$ are the time at which the sound is reproduced from the speaker 31. $T_{27}$ is a time at which the discharge lamp 21 starts re-discharge, which is determined by a period of time $\Delta t_{25}$ during which a high voltage pulse of about 30 KV is generated by an instantaneous re-ignition circuit 27 from the time $T_{23}$ at which the main power switch 35 is ON. $\Delta t_{21}$ and $\Delta t_{22}$ are determined by the microcomputer 32. In this case explanation is given on the basis of 66 $t_{21}=10$ seconds and $\Delta t_{23}=60$ seconds.

The operation of the ON time $T_{21}$ of the main power switch 35 is the same as that of the time $T_{11}$ in Case 1.

The operation of the OFF time $T_{22}$ of the main power switch 35 is also the same as that of the time $T_{21}$ in Case 1.

At the time $T_{25}$ after $\Delta t_{21}$ of the OFF time $T_{22}$ of the main power switch 35, the power switch 36 for the ballast and igniter circuit 26 is turned off under the control signal of the microcomputer 32. This means that all the power switches for the projection type image display apparatus are turned off. At the time $T_{23}$ after $\Delta t_{23}$ from the time $T_{22}$, the main power switch 35 is turned on again. At this time, the temperature of the discharge lamp 21 detected by a temperature sensor 33 is compared with a reference temperature previously set by a comparator 34. Normally, it requires several minutes before the temperature of the discharge lamp 21 is lowered to become ignitable in the ballast and igniter circuit 26 at room temperature. From the comparator 34, the fact that as a result of the comparison it is impossible for the discharge lamp 21 to be ignited by the ballast and igniter circuit 26 is fed to the microcomputer 32. Immediately, a re-ignition circuit power switch 37 is turned on by the control signal of the microcomputer 32, and in the discharge lamp 21, by the high voltage pulse of about 30 KV generated from the instantaneous re-ignition circuit 27, discharge is started to the time $T_{27}$. Thereafter, a voltage of 100 V is applied to the discharge lamp 21.

Also, at the time $T_{23}$, the image display circuit 28 drives the image display device 23 to form an optical image according to the video signal under the control signal of the microcomputer 32. The said optical image is projected onto the screen 25 by the projection lens 24 to give an image instantaneously. Furthermore, the sound is muted in the same manner as in the operation of the time $T_{21}$. Since at this time the high voltage pulse generating period $\Delta t_{25}$ is about 1 to 2 seconds, it is sufficient for the mute period $\Delta t_{22}$ to be set to about 4 to 5 seconds.

As described above, even if the main power switch is turned off, the discharge lamp is lighted for a prescribed period of time, and due to the additional provision of an instantaneous re-ignition circuit for re-igniting instantaneously the discharge lamp, the image can be immediately displayed at any time whatsoever, so that no feeling of inconvenience is given to the viewer. Furthermore, since the frequency of use of the instantaneous re-ignition circuit is suppressed to the utmost extent, and since the useless lighting duration of the discharge lamp, i.e., delay period of time after switching off the main power switch until the ballast and igniter circuit is stopped, can be suppressed, the invention has extremely large effect.

In the abovementioned explanation, a liquid crystal display device is used as an image display device, but any device, such as an electro-optical crystal device, may be used, provided that it can display images due to a variation of its optical characteristics caused by electrical signal.

An explanation has been provided for the embodiments of a projection type image display apparatus using the optical modulation type image display device, but the present invention is not limited to the abovementioned embodiments. The present invention has a characteristic point in igniting a metal discharge lamp for a prescribed period of time even after switching off the main power switch, and various modifications besides the above embodiments may be contrived.

What is claimed is:

1. A projection type image display apparatus comprising:

- a metal vapor discharge lamp for radiating light;
- a ballast and igniter circuit for igniting said metal vapor discharge lamp;
- an image display device for modulating the light from said metal vapor discharge lamp according to a video signal to produce a modulated light;
- an image display circuit for operating said image display device according to the video signal;
- an optical system for guiding the light radiated from said metal vapor discharge lamp to said image display device and projecting the modulated light from the image display device onto a screen;
- a main power switch for supplying power to said apparatus; and
- delay means for stopping said ballast and igniter circuit after a prescribed delay time after switching off the main power switch.

2. A projection type image display apparatus according to claim 1, wherein the delay means comprises a delay circuit for delaying an Off signal of the main power switch by the prescribed delay time to transmit it to the ballast and igniter circuit.

3. A projection type image display apparatus according to claim 1, wherein the delay means comprises a control signal generating circuit for detecting an OFF signal of the main power switch and generating an OFF signal for stopping the ballast and igniter circuit after the prescribed delay time.

4. A projection type image display apparatus according to claim 1, wherein the ballast and igniter circuit is started simultaneously with a switching ON of the main power switch.

5. A projection type image display apparatus according to claim 1, wherein the image display device displays a prescribed image for the prescribed delay time until the ballast and igniter circuit is stopped after switching off the main power switch.

6. A projection type image display apparatus according to claim 1, wherein the image display device is placed in a light intercepted state for the prescribed delay time until the ballast and igniter circuit is stopped after switching off the main power switch.

7. A projection type image display apparatus comprising:

- a metal vapor discharge lamp for radiating light;
- a ballast and igniter circuit for igniting said metal vapor discharge lamp;
- an image display device for modulating the light from said metal vapor discharge lamp according to a video signal to produce a modulated light;
- an image display circuit for operating said image display device according to the video signal;
- an optical system for guiding the light radiated from said metal vapor discharge lamp to said image display device and projecting the modulated light from the image display device onto a screen;
- a main power switch for supplying power to said apparatus; and
- a means for detecting a switching off of the main power switch and stopping said ballast and igniter circuit a prescribed delay time after the switching off of the main power switch to turn off the metal vapor discharge lamp in the absence of the main power switch being switched on again during said prescribed period after the switching off thereof.

8. A projection type image display apparatus comprising:

- a metal vapor discharge lamp for radiating light;
- a ballast and igniter circuit for igniting said metal vapor discharge lamp;
- an image display device for modulating the light from said metal vapor discharge lamp according to a video signal to produce a modulated light;
- an image display circuit for operating said image display device according to the video signal;
- an optical system for guiding the light radiated from said metal vapor discharge lamp to said image display device and projecting the modulated light from the image display device onto a screen;
- an audio signal processing circuit for processing an audio signal; and
- an audio signal control means for muting the audio signal for a prescribed period of time from a start of an igniting operation of said ballast and igniter circuit.

9. A projection type image display apparatus according to claim 8, wherein the audio signal control means comprises a delay circuit for delaying an ON signal of a main power switch by the prescribed period of time to transmit it to the audio signal processing circuit.

10. A projection type image display apparatus according to claim 8, wherein the audio signal control means comprises an audio muting circuit for detecting an ON signal of a main power switch and muting the audio signal for the prescribed period of time.

11. A projection type image display apparatus comprising:
- a metal vapor discharge lamp for radiating light;
- a ballast and igniter circuit for igniting said metal vapor discharge lamp;
- an instantaneous re-ignition circuit for re-igniting instantaneously said metal vapor discharge lamp;
- an image display device for modulating a light according to a video signal to obtain a modulated light;
- an image display circuit for operating said image display device according to the video signal;
- an optical system for guiding the light radiated from said metal vapor discharge lamp to said image apparatus and projecting the modulated light from the image display device onto a screen;
- a main power switch for supplying power to said apparatus;
- a delay means for providing a prescribed delay time until stopping said ballast and igniter circuit after switching off a main power switch; and
- a control means for starting said instantaneous re-ignition circuit at a time of switching on the main power switch after the stopping of said ballast and igniter circuit.

12. A projection type image display apparatus according to claim 11, wherein the delay means comprises a delay circuit for delaying an OFF signal of the main power switch by the prescribed delay time to transmit it to the ballast and igniter circuit and the control means, and
- the control means comprises a means for detecting an ON signal of the main power switch generated after the OFF signal is delayed in the delay circuit, and a means responsive to the ON signal for starting the instantaneous re-ignition circuit.

13. A projection type image display apparatus according to claim 11, wherein the delay means comprises a first control signal generating circuit for detecting an OFF signal of the main power switch and, after the prescribed delay time, generating an OFF signal to the ballast and igniter circuit; and the control means comprises a second control signal generating circuit for generating in ON signal of the instantaneous re-ignition circuit on detection of an ON signal of the main power switch after the generation of the OFF signal of said ballast and igniter circuit.

14. A projection type image display apparatus according to claim 11, wherein the control means comprises a temperature sensor for measuring a temperature of the metal vapor discharge lamp and a detecting means for detecting an ON signal of the main power switch which is generated when the metal vapor discharge lamp is at a temperature higher than a prescribed temperature, and a means responsive to the ON signal detected by the detecting means for starting the instantaneous re-ignition circuit.

15. A projection type image display apparatus according to claim 11, wherein the image display device displays a prescribed image for the prescribed delay time until said ballast and igniter circuit is stopped after the switching off of the main power switch.

16. A projection type image display apparatus according to claim 11, wherein the image display device is placed a light intercepted state for the prescribed delay time until the said ballast and igniter circuit is stopped after the switching off of the main power switch.

17. A projection type image display apparatus comprising:
- a metal vapor discharge lamp for radiating light;
- a ballast and igniter circuit for igniting said metal vapor discharge lamp;
- an instantaneous re-ignition circuit for re-igniting instantaneously said metal vapor discharge lamp;
- an image display device for modulating a light according to a video signal to obtain a modulated light;
- an image display circuit for operating said image display device according to the video signal;
- an optical system for guiding the light radiated from said metal vapor discharge lamp to said image apparatus and projecting the modulated light from the image display device onto a screen;
- a main power switch for supplying power to said apparatus; and
- a means for detecting a switching off of the main power switch, and after a prescribed delay period of time, stopping said metal vapor discharge lamp to turn off the metal vapor discharge lamp, and, when, after stopping said metal vapor discharge lamp, the main power switch is turned on, starting said instantaneous re-ignition circuit.

18. A projection type image display apparatus comprising:
- a metal vapor discharge lamp for radiating light;
- a ballast and igniter circuit for igniting said metal vapor discharge lamp;
- an instantaneous re-ignition circuit for re-igniting instantaneously said metal vapor discharge lamp;
- an image display device for modulating a light according to a video signal to obtain a modulated light;
- an image display circuit for operating said image display device according to the video signal;
- an optical system for guiding the light radiated from said metal vapor discharge lamp to said image apparatus and projecting the modulated light from the image display device onto a screen;
- an audio signal processing circuit for processing an audio signal;
- a main power switch for supplying power to said apparatus; and
- an audio signal control means for muting the audio signal for a prescribed period of time from a start of the ballast and igniter circuit or for a prescribed period of time from a start of said instantaneous re-ignition circuit.

19. A projection type image display apparatus according to claim 18, wherein the audio signal control means comprises a delay circuit for delaying an ON signal of the main power switch by the prescribed period of time and for transmitting it to the audio signal processing circuit.

20. A projection type image display apparatus according to claim 18, wherein the audio signal control means comprises a voice muting circuit for detecting an ON signal of the main power switch and for muting the audio signal for the prescribed period of time.

* * * * *